(12) United States Patent
Zha et al.

(10) Patent No.: US 11,151,423 B2
(45) Date of Patent: Oct. 19, 2021

(54) PREDICTIVE MODELS FOR VISUALLY CLASSIFYING INSECTS

(71) Applicant: Verily Life Sciences LLC, South San Francisco, CA (US)

(72) Inventors: Tiantian Zha, Mountain View, CA (US); Yaniv Ovadia, Cambridge, MA (US); Daniel Newburger, Mountain View, CA (US); Dilip Krishnan, Arlington, MA (US); Josh Livni, Davis, CA (US); Mark Desnoyer, San Francisco, CA (US)

(73) Assignee: VERILY LIFE SCIENCES LLC, South San Francisco, CA (US)

( * ) Notice: Subject to any disclaimer, the term of this patent is extended or adjusted under 35 U.S.C. 154(b) by 472 days.

(21) Appl. No.: 15/796,094

(22) Filed: Oct. 27, 2017

(65) Prior Publication Data

US 2018/0121764 A1    May 3, 2018

Related U.S. Application Data

(60) Provisional application No. 62/414,597, filed on Oct. 28, 2016.

(51) Int. Cl.
*G06K 9/62* (2006.01)
*G06K 9/32* (2006.01)
(Continued)

(52) U.S. Cl.
CPC ......... *G06K 9/6267* (2013.01); *G05B 13/027* (2013.01); *G05B 13/048* (2013.01); *G06K 9/3241* (2013.01); *G06K 9/627* (2013.01);
*G06T 7/0002* (2013.01); *G06T 7/0004* (2013.01); *G06K 2209/19* (2013.01);
(Continued)

(58) Field of Classification Search
CPC .... G06K 9/6267; G06K 9/627; G06K 9/3241; G06K 2209/19; G06T 7/0004; G06T 7/0002; G06T 2207/20084; G06T 2207/20081; G05B 13/027; G05B 13/048; G06N 3/082; G06N 3/0454; G06N 3/084
See application file for complete search history.

(56) References Cited

U.S. PATENT DOCUMENTS 7,496,228 B2   2/2009   Landwehr et al.
8,755,571 B2   6/2014   Tsai et al.
(Continued)

FOREIGN PATENT DOCUMENTS

WO    2009067089    5/2009

OTHER PUBLICATIONS

Weiguang Ding et al. ("automatic moth detection from trap images for pest management") (Year: 2016).*
(Continued)

*Primary Examiner* — Solomon G Bezuayehu
(74) *Attorney, Agent, or Firm* — Kilpatrick Townsend & Stockton LLP

(57) ABSTRACT

Insects can be localized and classified using a predictive model. To begin, image data is obtained that corresponds to the insects. Using a predictive model, samples of the image data are evaluated to determine whether the image portions include an insect and, if so, into what category the insect should be classified (e.g., male/female, species A/species B, etc.).

30 Claims, 9 Drawing Sheets

(51) Int. Cl.
  *G06T 7/00* (2017.01)
  *G05B 13/02* (2006.01)
  *G05B 13/04* (2006.01)
  *G06N 3/04* (2006.01)
  *G06N 3/08* (2006.01)
(52) U.S. Cl.
  CPC .......... *G06N 3/0454* (2013.01); *G06N 3/082* (2013.01); *G06N 3/084* (2013.01); *G06T 2207/20081* (2013.01); *G06T 2207/20084* (2013.01)

(56) References Cited

U.S. PATENT DOCUMENTS

| | | | |
|---|---|---|---|
| 8,897,575 | B2 | 11/2014 | Ding et al. |
| 8,989,493 | B1* | 3/2015 | Huang .................... G06T 5/001 382/181 |
| 2001/0036304 | A1* | 11/2001 | Yang .................... G06K 9/0014 382/132 |
| 2003/0110038 | A1 | 6/2003 | Sharma et al. |
| 2004/0208375 | A1* | 10/2004 | Gupta .................... G06T 7/254 382/217 |
| 2005/0025357 | A1* | 2/2005 | Landwehr ............. A01M 1/026 382/170 |
| 2005/0251347 | A1* | 11/2005 | Perona .................. G06K 9/522 702/19 |
| 2008/0285860 | A1* | 11/2008 | Datta .................... G06K 9/4652 382/224 |
| 2009/0003698 | A1* | 1/2009 | Milward ................. G06K 9/38 382/171 |
| 2011/0115950 | A1* | 5/2011 | Wach .................... H04N 5/357 348/241 |
| 2013/0044940 | A1* | 2/2013 | Cohen ................... G06T 7/187 382/154 |
| 2013/0120549 | A1* | 5/2013 | Momonoi .......... G06K 9/00597 348/78 |
| 2015/0023566 | A1 | 1/2015 | Fryshman |
| 2015/0179150 | A1* | 6/2015 | Andrysco ............... G06F 3/005 345/156 |
| 2016/0042249 | A1* | 2/2016 | Babenko ............ G06K 9/00744 382/170 |
| 2016/0235050 | A1* | 8/2016 | Janet ...................... A01M 1/023 |
| 2016/0267319 | A1* | 9/2016 | Murillo ............... G06K 9/00604 |
| 2017/0046567 | A1* | 2/2017 | Hong .................. G06K 9/00335 |
| 2017/0046591 | A1* | 2/2017 | Lee ..................... H04N 5/23219 |
| 2017/0230621 | A1* | 8/2017 | Lawrenson .......... A61B 3/0025 |
| 2018/0084772 | A1* | 3/2018 | Peeters ................. A01M 1/026 |
| 2018/0184893 | A1* | 7/2018 | Sahler .................. G02B 27/017 |
| 2019/0000059 | A1* | 1/2019 | Marka .................. A01M 31/002 |
| 2019/0019066 | A1* | 1/2019 | Fryshman ............. A01M 99/00 |
| 2019/0059388 | A1* | 2/2019 | Watts ..................... A01N 63/02 |
| 2019/0137758 | A1* | 5/2019 | Banks .................. H04N 13/144 |
| 2019/0279373 | A1* | 9/2019 | Boss ........................ G06T 7/33 |

OTHER PUBLICATIONS

International Application No. PCT/US2017/058872, "International Preliminary Report on Patentability", dated May 9, 2019, 16 pages.
Ding et al., "Automatic Moth Detection from Trap Images for Pest Management", Retrieved from the internet: https://arxiv.org/pdf/1602.07383.pdf, Feb. 24, 2016, pp. 1-17.
International Application No. PCT/US2017/058872, "International Search Report and Written Opinion", dated Jan. 9, 2018, 18 pages.
European Application No. 17863802.9, Extended European Search Report, dated Aug. 10, 2020, 9 pages.
Kumar et al., "Robust Insect Classification Applied to Real Time Greenhouse Infestation Monitoring", Also Available as: URL :https://pdfs.semanticscholar.org/ 71f9/c50ec4bdf66f5b6365fd158ce541ede4f2fd.pdf, Dec. 31, 2010, pp. 1-4.
Singapore Application No. 11201903022U, Written Opinion, dated Dec. 28, 2020, 7 pages.

* cited by examiner

PREDICTIVE MODELS FOR VISUALLY CLASSIFYING INSECTS

CROSS-REFERENCES TO RELATED APPLICATIONS

The present application is related to and claims the benefit of priority of U.S. Provisional Application No. 62/414,597, filed Oct. 28, 2016, entitled "USE OF MACHINE LEARNING TO VISUALLY CLASSIFY INSECTS", the entirety of which is incorporated herein by reference.

BACKGROUND

As part of a Sterile Insect Technique (SIT) program, insects be may be classified as male or female and selectively sterilized before being released into the wild. Such programs may be implemented to minimize or eliminate insect-borne diseases and/or to manage insect populations in certain areas. Depending on the program, classification and sterilization may be performed at one or more stages of insect development.

Existing approaches for classification are various. For example, some approaches have attempted to classify males and females using non-visual attributes, such as wing beat frequency. Other approaches have relied on visual attributes such as abdomen size and antennae. Visual approaches have typically relied on humans visually inspecting each insect (or a batch of insects) and determining whether the particular insect is male or female (or whether the batch includes females that could contaminate a batch of males).

In recent years, computer-implemented visual inspection approaches been applied to this problem. These approaches have typically relied on classical object detection algorithms. Using these algorithms, however, may present challenges when classifying particular insect populations that have certain anatomical characteristics. For example, adult mosquitoes, when in a group, typically cluster together and because of their slender bodies and long legs, it may be difficult to discriminate one mosquito from another, let alone a male from a female.

For classifying some insect populations (e.g., moths), machine learning techniques have been applied to automate classification. These approaches, however, have not proved reliable for all insect populations at least because of their reliance on training data developed using heuristics and their inability to localize and classify overlapping insects; especially, those with slender bodies and long legs like mosquitoes.

BRIEF SUMMARY

Various examples are described including systems, methods, and devices relating to locating, classifying, and counting insects using predictive models.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method, including: accessing an image depicting a plurality of insects on a surface. The computer-implemented method also includes dividing the image into a plurality of image patches. The computer-implemented method also includes determining, using a predictive model, locations of individual insects of the plurality of insects in the plurality of image patches. The computer-implemented method also includes classifying, using the predictive model, the individual insects into at least one category based at least in part on an insect parameter. The computer-implemented method also includes outputting insect information from the predictive model based at least in part on the locations of the individual insects and the at least one category. Other embodiments of this aspect include corresponding computer systems, apparatus, and computer programs recorded on one or more computer storage devices, each configured to perform the actions of the methods.

One general aspect includes a system, including: an imaging device configured to capture images of insects supported by a surface; a computing device in communication with the imaging device, and configured to at least cause the imaging device to capture an image of the surface, the image including a plurality of insects. The computing device also configured to determine, using a predictive model, locations of individual insects of the plurality of insects in the image. The computing device also configured to classify, using the predictive model, the individual insects into at least one category based at least in part on an insect characteristic. The computing device also configured to output insect information from the predictive model based at least in part on the locations of the individual insects and the at least one category. Other embodiments of this aspect include corresponding computer systems, apparatus, and computer programs recorded on one or more computer storage devices, each configured to perform the actions of the methods.

One general aspect includes one or more non-transitory computer-readable medium including computer-executable instructions that, when executed by one or more computer systems, cause the computer systems to perform operations including: accessing an image depicting a plurality of insects. The one or more non-transitory computer-readable medium also includes dividing the image into a plurality of image patches. The one or more non-transitory computer-readable medium also includes determining, using a predictive model, locations of individual insects of the plurality of insects in the plurality of image patches. The one or more non-transitory computer-readable medium also includes classifying, using the predictive model, the individual insects into at least one category based at least in part on a mosquito characteristic. The one or more non-transitory computer-readable medium also includes outputting insect information from the predictive model based at least in part on the locations of the individual insects and the at least one category. Other embodiments of this aspect include corresponding computer systems, apparatus, and computer programs recorded on one or more computer storage devices, each configured to perform the actions of the methods.

One general aspect includes a computer-implemented method, including: accessing image data representing at least one mosquito on a surface. The computer-implemented method also includes dividing the image data into a plurality of image portions; evaluating, using a predictive model, a first image portion of the plurality of image portions by at least. The computer-implemented method also includes (i) locating the at least one mosquito represented in the first image portion. The computer-implemented method also includes (ii) classifying the at least one mosquito into at least one category based at least in part on an insect parameter. The computer-implemented method also includes outputting insect information from the predictive model relating to the at least one mosquito based at least in part on locating the at least one mosquito and classifying the at least one mosquito. Other embodiments of this aspect include corresponding computer systems, apparatus, and computer programs recorded on one or more computer storage devices, each configured to perform the actions of the methods.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Examples are described herein in the context predictive models for use in classification and localization of mosquitoes. Those of ordinary skill in the art will realize that the following description is illustrative only and is not intended to be in any way limiting. For example, the techniques described herein can be used to classify and localize mosquitoes in other stages and/or other insects. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

In an illustrative example, a predictive model such as convolutional neural network (CNN) is used to localize, classify, and/or count a population of mosquitoes. Once the mosquitoes have been localized, classified, and/or counted, certain ones of the mosquitoes can be removed from population, terminated, and/or sterilized. For example, the predictive model can be used in connection with a SIT program to remove female mosquitoes from a group of mosquitoes prior to sterilizing male mosquitoes in the group.

The predictive model may be trained using labeled image patches of images of sample sets of mosquitoes. First labels may localize any mosquitoes present in the image patches by their heads and tails. Second labels may classify localized mosquitoes into a category (e.g., male/female, species A/species B, etc.).

When initialized, the predictive model may take as input an image of mosquitoes (e.g., a population of mosquitoes within a petri dish or on some other surface). The image may be divided into image patches having similar characteristics as those used for training. Output from the predictive model may identify image patches that include mosquitoes, a number of mosquitoes found on each patch, and/or a classification of each mosquito found on each patch. Based on the output from the predictive model, certain actions can be triggered to occur automatically. For example, when a female mosquito is detected on a patch, a human operator may be alerted or a robotic arm can be instructed to remove the female mosquito.

This illustrative example is given to introduce the reader to the general subject matter discussed herein and the disclosure is not limited to this example. The following sections describe various additional non-limiting examples techniques relating to using predictive models to classify insects.

Figure 1:
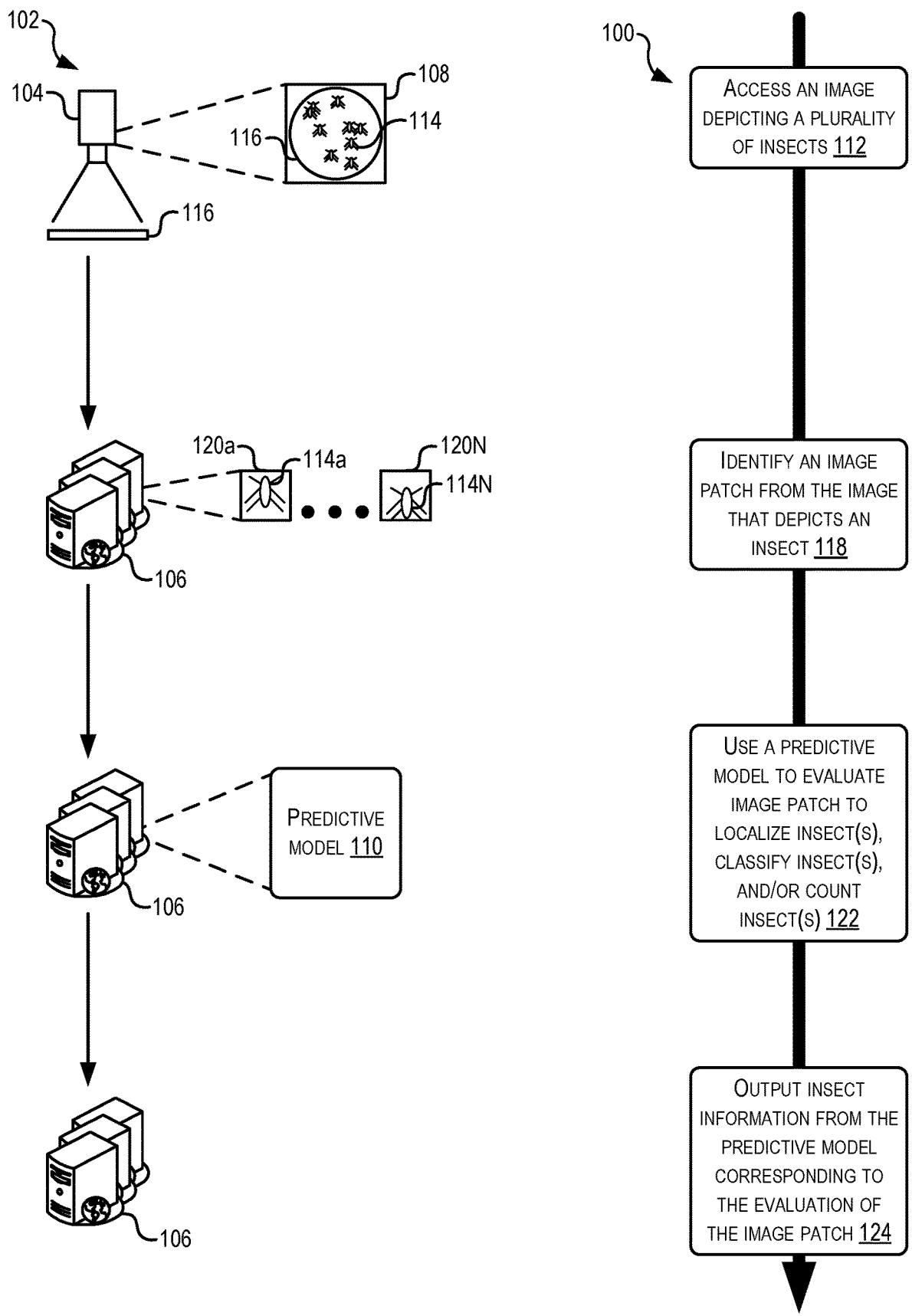
FIG. 1 illustrates a block diagram and a corresponding flowchart illustrating a process for using a predictive model to classify insects, according to at least one example.

Turning now the figures, FIG. 1 illustrates a block diagram 102 and a corresponding flowchart illustrating a process 100 for using a predictive model to classify insects, according to at least one example. The diagram 102 includes an imaging device 104 and a computing device 106. The imaging device 104, which may include any suitable combination of image sensors, lenses, computer hardware, and/or software, may be in network communication with the computing device 106. The imaging device 104 may be configured to output raw image data and/or image data that has been processed in some manner to form image(s) 108.

The computing device 106, as described herein, may be any suitable electronic device (e.g., personal computer, hand-held device, server computer, server cluster, virtual computer, etc.) configured to execute computer-executable instructions to perform operations such as those described herein. In some examples, the computing device 106 is configured to host a predictive model 110.

The predictive model 110 may be a CNN model built using any suitable model generation software (e.g., TensorFlow using the TF-learn framework). For example, the predictive model 110 may be a medium-sized CNN with 6 layers, an InceptionV3 architecture with channel depths scaled by 0.5, and/or any other suitable model.

The model may also be created using any other suitable machine learning approach having similar characteristics to CNN. The predictive model 110 may read any suitable sized pixel image patch (e.g., 500×500), may proceed through any suitable number of classic convolutional layers (e.g., six) with ReLU activations and 2×2 max-pooling, and may be followed by a complete spatial sum-pool and a fully-connected layer. The image patches may be extracted at random from images of insects. A heuristic filter may be employed to discard obviously empty segments of the image. Per standard practices, dropout and random distortions to the images may be employed at training.

The process 100 may begin at 112 by accessing an image (e.g., the image 108) depicting a plurality of insects 114. This may be performed by the computing device 106. The image 108 may have been captured by the imaging device 104 under the operation of the computing device 106. For example, the computing device 106 may instruct the imaging device 104 to capture the images 108. In some examples, the imaging device 104 captures the images 108 in a different manner, e.g., according to a fixed schedule (e.g., every five minutes), based on a trigger (e.g., after detecting movement in an insect population), and in any other suitable manner.

In some examples, the image 108 may be captured while the insects 114 are resting on a surface 116. For example, the surface 116 may be a petri dish including active or inactive (e.g., sedated) insects 114, a pathway including active or inactive insects 114 (e.g., a chamber in which the insects 114 move from a first position to a second position), and any other suitable surface on which the insects 112 may rest. In FIG. 1, the surface 116 is illustrated as a petri dish.

At 118, the process 100 may include identifying an image patch 120 from the image 118 that depicts the insects 114. This may be performed by the computing device 106. As illustrated in FIG. 1, a plurality of image patches 120a-120N may be identified from the image 108. This may be done by dividing the image 108 into an arbitrary number of image patches 120. In some examples, the image patches 120 are of uniform shape and size. The image patches 120, in other examples, may be of arbitrary shape and size. In some examples, the shape and size of the image patches 120 may correspond, in part, to training data used to train the predictive model 110.

At 122, the process 100 may include using the predictive model 110 to evaluate the image patch 120 to localize insects 114, classify insects 114, and/or count insects 114. This may be performed by the computing device 106. In some examples, the image patches 120 are input into the predictive model 110 and the localization, classification, and counting are output from the predictive model 110.

At 124, the process 100 may include outputting insect information from the predictive model corresponding to the evaluation of the image patch. This may be performed by the computing device 106. In some examples, the insect information from the predictive model 110 is on a per-patch basis and summed to get totals for the image 108. In a SIT program, this insect information can be used to compute certain metrics such as a female contamination rate for a particular insect sample (e.g., the insects 114 on the surface 116). In some examples, the insect information includes location information (e.g., based on the localization), classification information (e.g., based on the classification), and counting information (e.g., based on the counting). This insect information can be used by downstream processes to further interact with the insects 114. For example, a robotic arm can be instructed to remove a localized and classified female insect from the surface 116. Based on a spatial distribution of the insects 114 on the surface 116 determined from the insect information, conditions in which the surface 116 is located may be adjusted. For example, when the surface 116 is a petri dish in which insects are being cultivated, the conditions may include temperature, light, humidity, and the like that may impact how growth rates of the insects 114.

Figure 2:
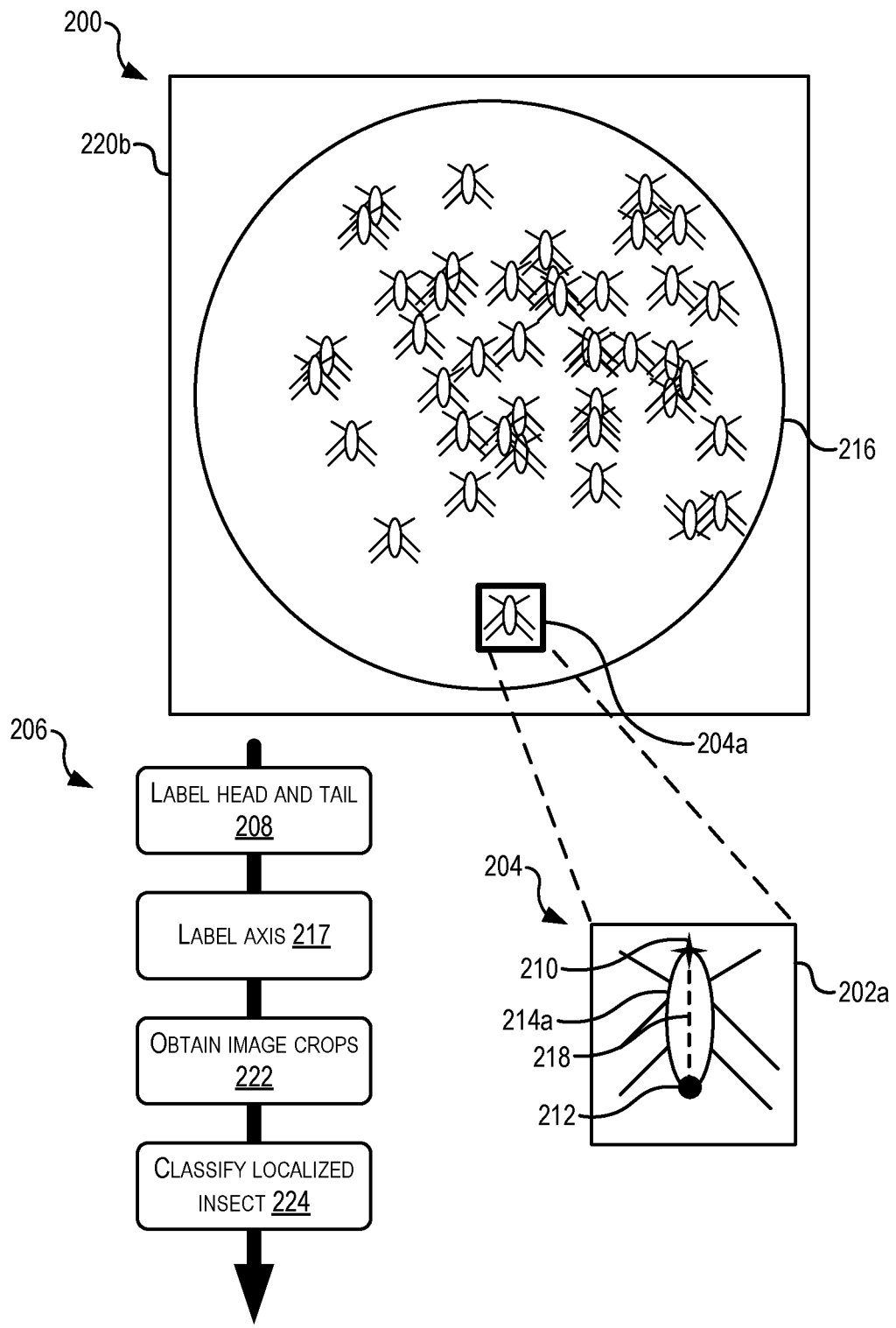
FIG. 2 illustrates an example image used as training data for training a predictive model for classifying insects, according to at least one example.

FIG. 2 illustrates an example image 200 used as training data for training the predictive model 110 for classifying insects 114, according to at least one example. The image 200 is represented as having a square shape. It should be understood, however, that the image 200 may take any other suitable shape, including uniform and non-uniform shapes. For example, the image 200 may be a 5000×5000 pixel image. In some examples, larger or smaller images may be used (e.g., 2000×2000 pixel image). The image 200 may be one of a plurality of different images that can be used to train the predictive model 110. For example, two hundred or more 5000×5000 pixel images may be used to train the predictive model 110.

The image 200 depicts a plurality of insects 214 on a surface 216, which may be a Petri dish and is an example of the surface 216. The insects 214 are examples of the insects 114 described herein. When the predictive model 110 is being trained to classify male vs. female insects, each Petri dish may be loaded with approximately 200 insects at a male:female ratio of approximately 10:1. Other ratios including more or less mosquitoes may also be used. In some examples, the ratio of 10:1 may be higher than would be expected during production (e.g., after training), but training at this ratio may result in more cautious predictions during production. The image 200, and other training images, may be collected in any suitable manner.

FIG. 2 illustrates an example flow corresponding to a process 206 for labeling the image 200 to build a training data set. The process 206 will be described with reference to the insect 214a. The process 206 may be performed by one or more computing devices that receive user input from one or more human users. For example, a user interface may be presented on the user device that includes an area to display the image 200 and a set of labeling selections. The human user may zoom in on the image 200 in order to label the insects 214, as described with reference to the insect 214a.

The process 206 may begin at 208 by labeling two endpoints with respect to the insect 214a. As illustrated in magnified view 204, the two end points may correspond to a head 210 and a tail 212 of the insect 214a. At 217, the end points corresponding to the head 210 and the tail 212 may be connected by an alignment axis 218. The alignment axis 218 may correspond to a length of the insect 214a. The labeling of the two endpoints may essentially localize the insect 214a (e.g., indicate that a head and a tail of the insect 214a have been identified within an image crop 202a). This localization can be verified by the same human user and/or by a different human user. If the localization is not confirmed, the initial human user may be instructed to correct the labeling.

If the localization is confirmed, then at 222, the process 206 obtains the image crop 202a (e.g., a training image patch) corresponding to the localized insect 214a. This may include obtaining image crops for all localized insects 214 across the image 200. Thus, in some examples, the image 200 may be divided into N number of image crops 220a-220N. The image crops 202 may be centered around the localized insects 214 and can take any arbitrary size corresponding to dimensions of the insects 214. For example, a height and width of the of the crops 202 may correspond to an average height of a population of insects such as mosquitoes. In some examples, the image crops 202 are obtained based on the end points corresponding to the head 210 and the tail 212. Thus, rather than using bounding boxes to define the training elements, the insects 214 are represented by rater assigned endpoints. In some examples, the image crops 220 may be sized such that more than one insect 214 can be depicted. This is especially true when the insects 214 in the image 200 overlap each other.

At 224, the process 206 may include classifying the localized insect 214a. This may include requesting one or more human users to classify the localized insect 214a as male, female, or unknown. In some examples, the users may classify the localized insect 214a according to any other category (e.g., species, health, size, etc.). In some examples, the human users may be given classification rules, including images, reading materials, and the like, to review as part of classifying the insects 214. In a male/female classification of mosquitoes, female mosquitoes may be distinguished by larger bodies and little-to-no feathering on their antennae.

In some examples, the one or more users described herein may include a human computational platform such as Amazon Turk® (or other set of organized or unorganized human users). The process 206 may be defined to include two phases, a first phase in which the workers localize insects as head-to-tail segments (e.g., blocks 208 and 217), and a second phase in which workers classify each insect as male/female from the image crop centered around the individual insect (e.g., blocks 222 and 224). In some examples, the alignment axis 218 is overlaid on the image crop 202a in a manner that disambiguates overlapping insects.

Figure 3:
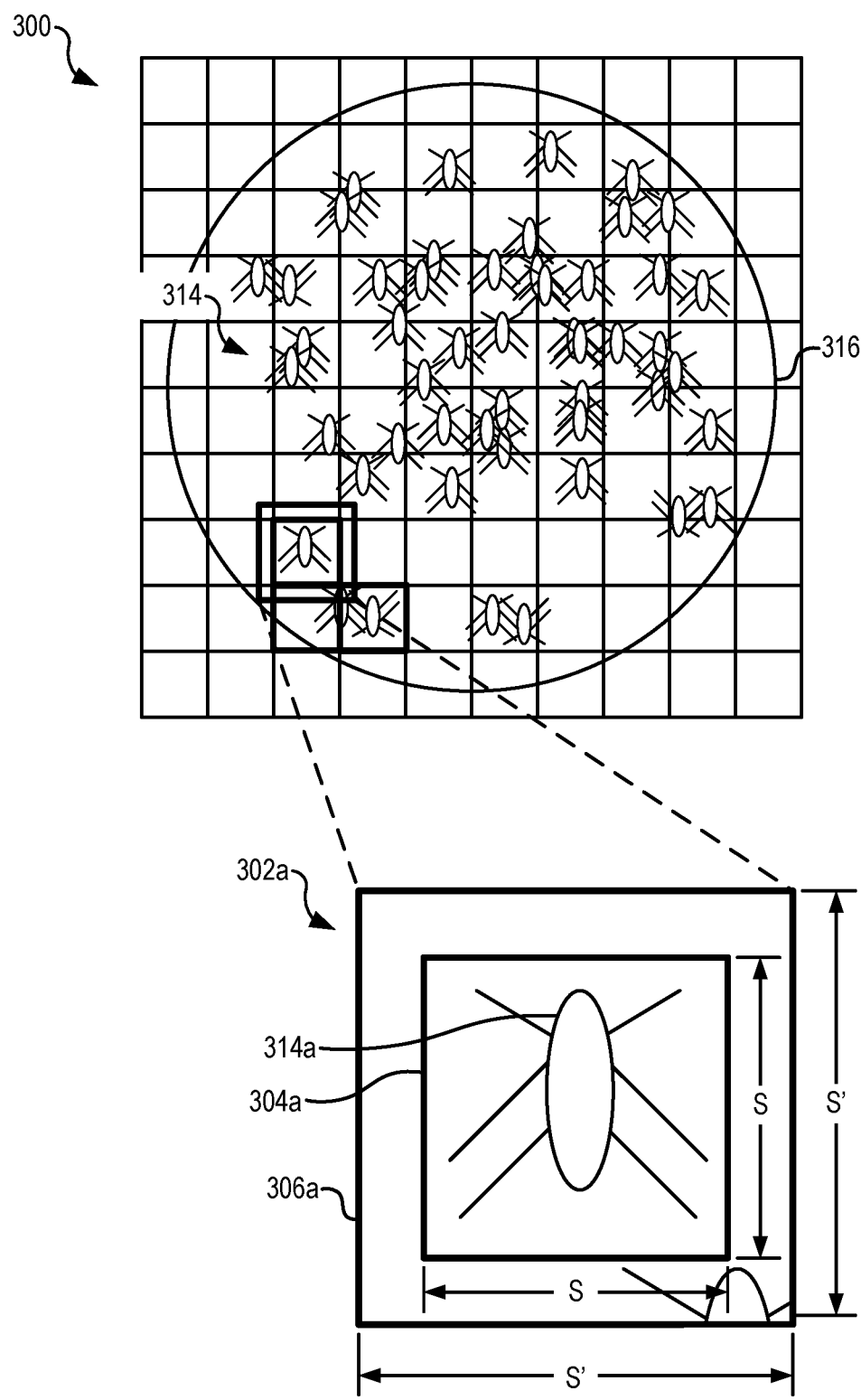
FIG. 3 illustrates an example image used as input to a predictive model for classifying insects, according to at least one example.

Once sufficient training data has been obtained by repeating the process 206 for the image 200 and for other images 200 depicting different arrangements of insects 214, the predictive model 110 may be trained. In a particular example, this may include using Google® Cloud's Hyperparameter tuning service by adjusted the following parameters to optimize per insect specificity at, e.g., 90% sensitivity and patch specificity at, e.g., 99% female-insect-sensitivity:

learning rate, batch size, and dropout probability
channels and kernel sizes associated with each convolutional layer
shared hidden layer size
target-box size, context-buffer size
image downscaling factor FIG. 3 illustrates an example image 300 used as input to the predictive model 110 for classifying insects 314, according to at least one example. The insects 314 may be depicted in the image 300 and may be supported on a surface 316. The insects 314 are examples of the insects 114 and the surface 316 is an example of the surface 316. In some examples, in order to produce counts, classifications, and localizations, the predictive model 110 may evaluate image data in the form of image patches 302a-302N. The image patches 302 may represent a uniform division of the image 300. In some examples, the image patches 302 may be adjusted (e.g., larger or smaller size, different shape, etc.) and the image 300 may be divided and analyzed using the adjusted image patches. As described herein, each image patch 302 may be evaluated independent of any other image patch 302. In this manner, each image patch 302 may stand on its own as including or not including an insect 314.

An example image patch 302a may include a central patch region 304a having a square shape and having dimensions S×S that are comparable in size to a single insect 314a (e.g., 500×500 pixels), for which the predictive model 110 will be applied. The central patch region 304a may also be non-square or have an arbitrary shape. The image patch 302a may also include a context region 306a. The context region 306a may have a similar shape as the central patch region 304a with C additional pixels surrounding the S×S patch. In this manner, the context region 306a may be have dimensions S'×S', where S'=S+C. In some examples, the image patch 302 may be referred to as a model window. The boundaries between the central patch region 304a and the context region 306a may be conveyed to the predictive model 110 by concatenating a context vs. central-patch indicator mask to the window's color channels.

In some examples, the predictive model 110 may be configured to generate outputs (e.g., insect information) including, for example, female detection: true if any portion of a female (or unknown) insect is present in the central patch region 304a, female counting: the sum of fractional female (or unknown) insects contained in the central patch region 304a, and/or male counting: the sum of fractional male insects contained in the central patch region 304a. During implementation, the predictive model 110 may use the S'×S' sized image patches 302 with stride S. In some examples, sums may be added across the image patches 302. When detection predictions exceed some configurable threshold, certain actions may occur. For example, a human operator may be alerted who can insect the image patch 302 to verify the count, localization, and/or classification.

In some examples, to enable comparisons between models with varying S and C hyperparameter assignments, and to support interpretable and actionable evaluations, the implementation may avoid relying on per-patch metrics. To ascertain female-detection quality, predictive models can be compared using an array of per-insect specificity-at-sensitivity and sensitivity-at-specificity metrics where the label assigned to each insect is the maximum of patches containing any part of that insect.

In some examples, the specificity, sensitivity and normalized-squared-error metrics may not necessarily be actionable on their own. Instead, it may be determined a required number of samples to validate that out from an insect separation process (e.g., a system to separate insects) has a female contamination rate lower than $ø_0$ with P(false validation)<5%. To compute this evaluation, the insect separation process dynamics may be simulated using the predictive model's detection sensitivity and count error metrics.

Figure 4:
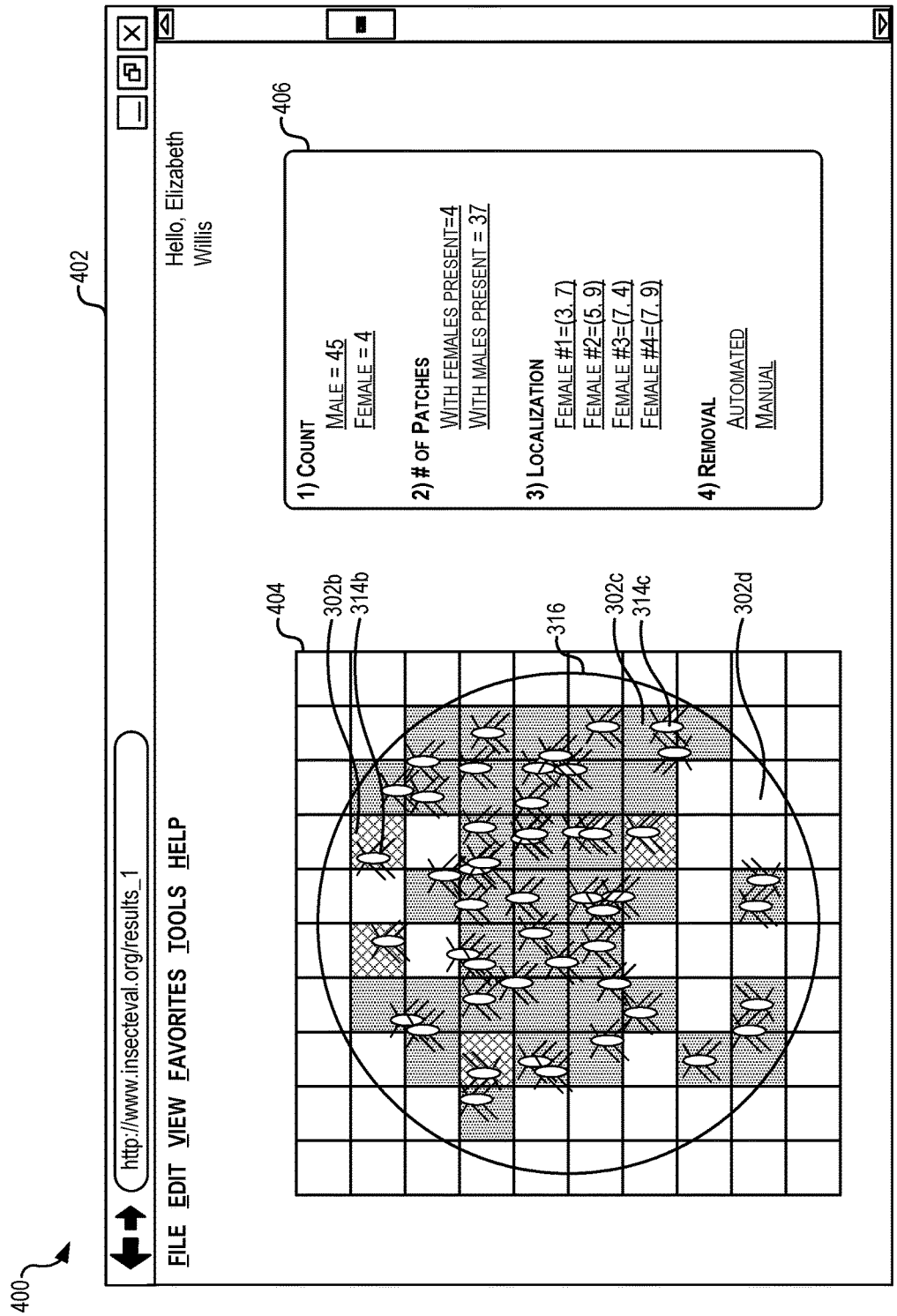
FIG. 4 illustrates an example user interface for presenting information about classifying insects using a predictive model, according to at least one example.

FIG. 4 illustrates an example user interface 400 for presenting information about classifying insects using the predictive model 110, according to at least one example. The user interface 400 may include a results view 402, as shown. The results view 402 of the user interface 400 may be presented at a user device based on insect information output from the predictive model 110. For example, a representation 404 of the image 300 may be presented in a first portion of the results view 402 and a results area 406 may be presented in a second portion of the results view 402. In this manner, the user interface 400 may represent results from an analysis of the image 300 described with reference to FIG. 3.

The representation 404 may depict the image patches 302 and the insects 314 as a set of user interface elements. The formatting of each image patch 302 may be adjusted depending on a classification of one or more insects 314 within the respective image patch 302. For example, as illustrated in FIG. 4, a first formatting has been applied to those image patches that include at least parts of female insects (e.g., image patch 302b including the insect 314b). A second formatting has been applied to those image patches that include at least parts of male insects (e.g., the image patch 302c including the insect 314c). A third formatting, or no formatting at all, has been applied to those image patches where neither male nor female insects 314 have been identified (e.g., the image patch 302d). In some examples, the results view 402 may be adjusted automatically as the insects 314 move on the surface 316. For example, the process of identifying and classifying the insects 314 may be performed continuously and the results thereof may be streamed via the user interface 400.

In a SIT program, the representation 404 may be used to alert a human user of female insects 314 and male insects that have been identified on the surface 316. Once identified, these insects can be interacted with in some manner (e.g., removed, sterilized, etc.).

As illustrated with reference to the results area 406, the results view 402 may include information that was derived by evaluating the image of the insects 314. For example, the results area 406 may identify count totals (e.g., 45 male insects and 4 female insects). The results area 406 may also identify a number of patches that have been highlighted (e.g., 4 patches with females present and 37 patches with males present). The results area 406 may also include localization information for one or more of the insects 314. The localization information may correspond to a set of coordinates of the image patch 302 (e.g., 3, 7) with respect to a fixed point. The localization information, in some examples, may correspond to the pixels of the image patch with respect to a fixed point. The pixels may be represented in any suitable manner. As illustrated with reference to the results area 406, the localization information may correspond to locations of the four identified female insects 314. The results area 406 may also include a list of action items such as those relating to removal of the insects 314. In some examples, selection of one of the removal actions will result in the female insects 314 being removed from the surface 316. Automated removal may include instructing a robotic manipulator to grasp the insects 314 and remove them. Manual removal may include instructing a human user to remove the insects 314.

At least some of the information (e.g., words, strings, lists, etc.) displayed in the results area 406 may be selectable to adjust the representation 404. For example, selection of one of the count options may highlight or otherwise flash those image patches 302 that correspond to the selection. Similarly, selection of one of the localized female insects 314 may highlight the image patch 302 in which the particular female insect 314 is located. In some examples, the results view 402 may be tailored to a user who is viewing the results view 402. For example, as illustrated, Elizabeth Willis is a user who is currently associated with the results view 402.

Figure 5:
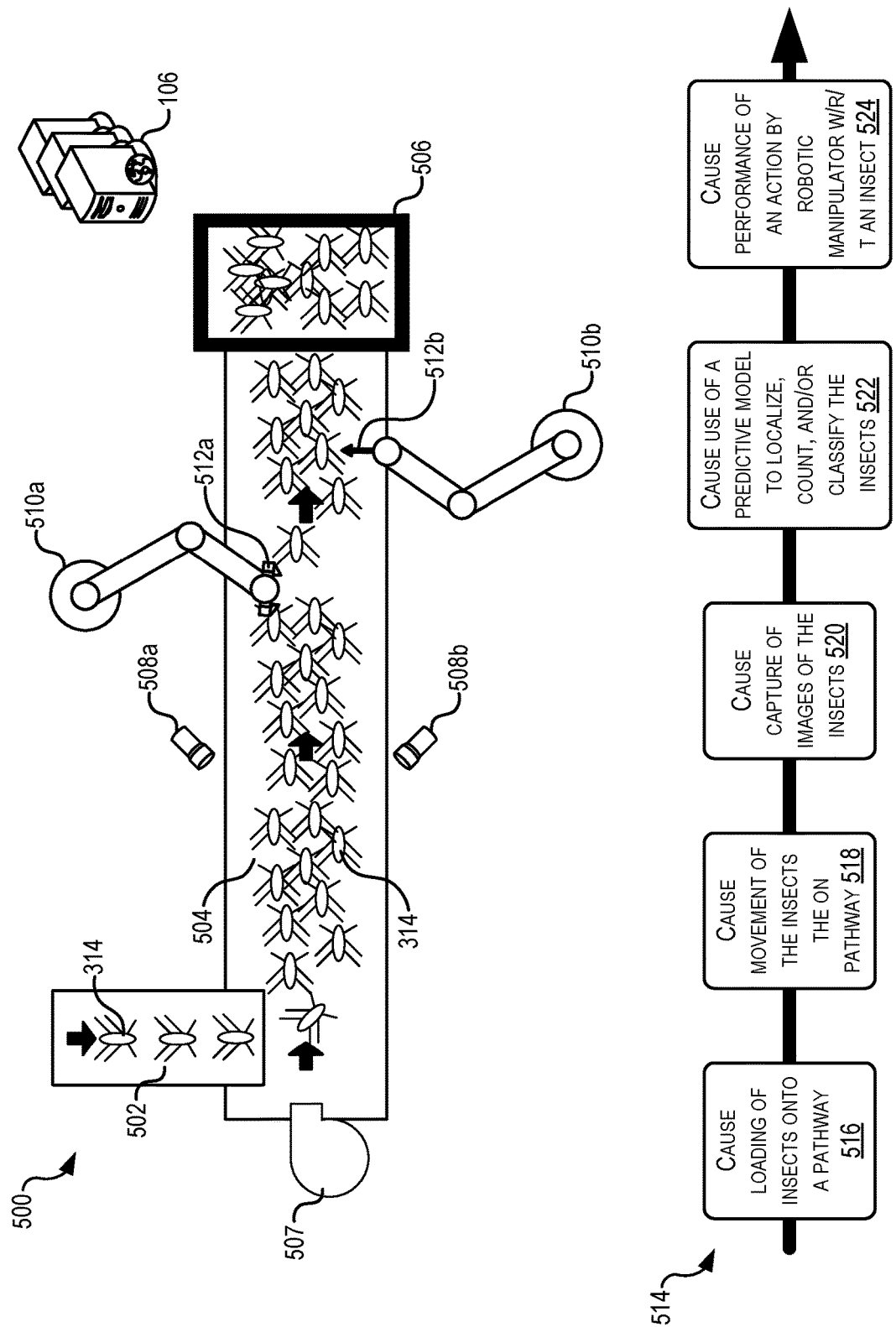
FIG. 5 illustrates an example system for implementing a sterile insect technique using output from a predictive model, according to at least one example.

FIG. 5 illustrates an example system 500 for implementing a sterile insect technique using output from the predictive model 110, according to at least one example. The system 500 may be implemented in a "factory" type setting where insects are reared, sterilized, and released into the wild. The system 500 may include a first pathway 502, a second pathway 504, a receptacle 506, an imaging package 508, one or more robotic manipulators 510a, 510b, and a computing device 106. Generally, the insects 314 may move on the pathways 502, 504 towards the receptacle 506. While moving (e.g., either on their own or by means of some device), the insects 314 can be imaged using the imaging package 508. The computing device 106 can input the images into the predictive model 110 to localize, count, and/or classify the insects 314 in the images. Based on output from the predictive model 110, the computing device 106 may instruct the robotic manipulators 510a, 510b to perform one or more actions with respect to the insects 314 (e.g., remove an insect 314, sterilize an insect 314, etc.).

The pathways 502, 504 may be constitute pathways of travel for the insects 314. A direction of travel of the insects 314 may begin with the first pathway 502, proceed onto the second pathway 504, and end in the receptacle 560. In some examples, the insects 314 may be active and encouraged to follow the direction of travel. For example, the insects on the second pathway 504 may be directed by means of a fan 507. In some examples, other means may be employed to direct the insects 314 (e.g., lighting elements, sounds, heating elements, etc.). The fan 507 may be managed by the computing device 106.

The pathways 502, 504 may include any suitable surface, which may be within an enclosure, by which the insects 314 may travel. For example, the pathways 502, 504 may be a series of enclosed chambers configured such that the insects 314 can walk from the first pathway 502 to the second pathway 504. In this manner the pathways 502, 504 may correspond to a surface such as those described herein. In some examples, the pathways 502, 504 may be wide enough that many insects 314 (e.g., ten, thirty, hundred, or more) can walk side-by-side. Depending on the number of insects 314 introduced into the pathways 502, 504, the wide surfaces may allow the insects 314 to naturally separate away from each other. Doing so may simplify the process of localizing, counting, and classifying the insects 314. This may be because the insects 314 are less likely to overlap on top of each other when there is sufficient space.

The receptacle 506 may be any suitable tote, box, or other receptacle capable of receiving and/or retaining the insects 314. In some examples, the insects 314 are classified and separated by the time the insects 314 are transferred to the receptacle 506. For example, the insects 314 in the receptacle 506 may be male insects, with little to no female insects.

The imaging package 508 may include a first imaging device 508a and a second imaging device 508b, which are examples of the imaging device 104. In some examples, the imaging package 508 may include a single imaging device. In any event, each imaging device 508a, 508b may include an image sensor and a lens. In some examples, the imaging devices 508a, 508b may be any suitable cameras capable of capturing RGB or other types of images. In some examples, the imaging devices 508a, 508b may be together constitute a stereo camera that enables capturing three-dimensional images of the insects 314. The imaging package 508 may be managed by the computing device 106.

The robotic manipulators 510 may be any suitable computer-controlled robotic device capable of interacting with the insects 314. In some examples, the robotic manipulators 510 may include any suitable end of arm tool (e.g., end effector) 512 so as to enable the techniques described herein. For example, the robotic manipulator 510a may include a grasper-type end of arm tool 512a. The grasper-type end of arm tool 512b may include a set of fingers of sufficient size and dexterity so as to pick up an insect 314 (e.g., a mosquito). The robotic manipulator 510b may include a laser end of arm tool 512b. The laser end of arm tool 512b may be configured to terminate or otherwise eliminate certain insects 314. For example, instead of removing insects using the grasper-type end of arm tool 512b, the laser end of arm tool 512b may be used to terminate unneeded insects (e.g., female mosquitoes in a SIT program). In some examples, other end of arm tools 512 may be used. For example, a sterilization end of arm tool may be used to selectively sterilize insects or groups of insects on the second pathway 504.

A process 514 for sorting insects may be implemented using the system 500. At least a portion of the process 514 may be performed under the control of the computing device 106.

The process 514 may begin at 516 by causing loading of insects on to the pathway. This may be performed by a human user transferring the insects 314 from a container onto the first pathway 502 and/or the second pathway 504. In some examples, a door may separate a first chamber from a second chamber that includes the first pathway 502 and/or the second pathway 504. In this example, causing loading of the insects 314 may include opening the door and allowing the insects 314 to move from the first chamber to the second chamber. In some examples, the door may be automated such that, responsive to an instruction from the computing device 106, the door may automatically be opened.

At 518, the process 514 may include causing movement of the insects on the pathway. This may be performed by the fan 507 under control of the computing device 106. In some examples, the fan 507 may be positioned to blow air towards the receptacle 506. In this manner, the insects 314 may move along the second pathway 504 towards the imaging package 508.

At 520, the process 514 may include causing capture of images of the insects. This may be performed by the imaging package 508 under control of the computing device 106. For example, the computing device 106 may determine a frequency at which the imaging package 508 should collect the images. In some examples, the imaging package 508 collects the images at any suitable frequency, which may be preprogrammed. The images may depict the insects 314 with respect to the second pathway 504.

At 522, the process 514 may include causing use of a predictive model to localize, count, and/or classify the insects. This may be performed by the computing device 106 using the predictive model 110. For example, the computing device 106 may receive the images captured at 520, and input those images into the predictive model 110. The predictive model 110 may then generate one or more of the outputs described herein.

At 524, the process 514 may include causing performance of an action by a robotic manipulator with respect to an insect. This may be performed by one of the robotic manipulators 510 under control of the computing device 106. For example, the computing device 106 may access insect information output from the predictive model 110 relating to locations, counts, and classifications to identify which of the insects 314 on the second pathway 504 should be removed, sterilized, or otherwise interacted with. Once identified, the computing device 106 may instruct one or more of the robotic manipulators 510 to perform the action. In some examples, the imaging package 508 may be included as part of the one or more of the robotic manipulators 510. In this example, the output from the imaging package 508 may correspond to a position and orientation of the end of arm tool 512 (e.g., capture images from the perspective of the end of arm tool 512).

Figure 6:
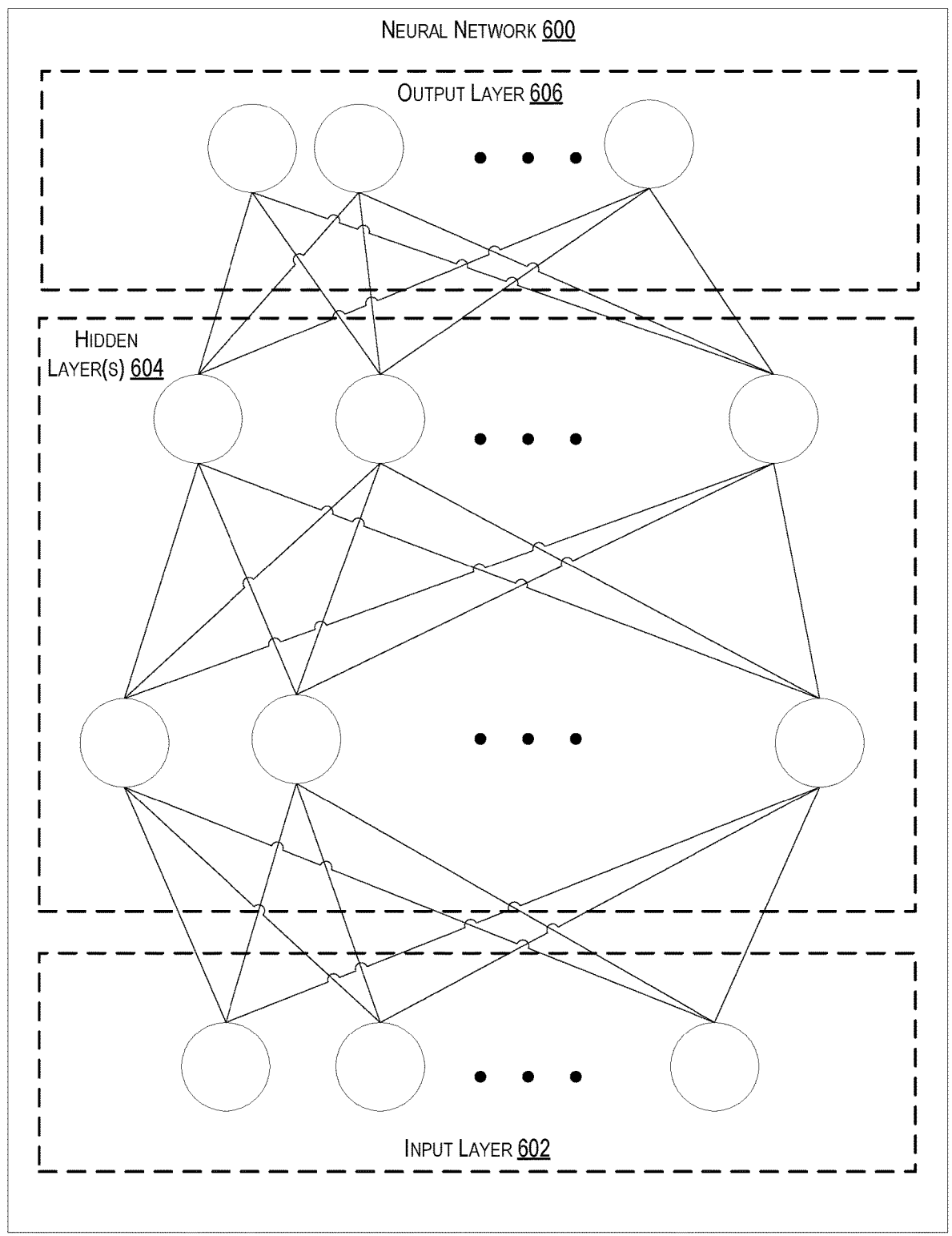
FIG. 6 illustrates an example predictive model in the form of a neural network, according to at least one example.

FIG. 6 illustrates an example predictive model in the form of a neural network 600, according to at least one example. The neural network 600 is an example of the predictive model 110 described herein. Some or all of the components of the neural network 600 can be implemented by a deep-learning system as part of an evaluation network and/or a proposal network.

Generally, the neural network 600 represents a network of interconnected nodes, such as an artificial neural network, where knowledge about the nodes is shared between the nodes. Each node represents a piece of information. Knowledge can be exchanged through node-to-node interconnections. Input to the neural network 600 activates a set of nodes. In turn, this set of nodes activates other nodes, thereby propagating knowledge about the input. This activation process is repeated across other nodes until an output node is selected.

As illustrated, the neural network 600 includes a hierarchy of layers representing a hierarchy of nodes. At the lowest hierarchy level, an input layer 602 exists. The input layer 602 includes a set of nodes that are referred to herein as input nodes. Each of these input nodes is mapped to a particular image feature. At the highest hierarch level, an output layer 606 exists. The output layer 606 is mapped to a particular prediction such as count, classification, and/or localization. A hidden layer 604 exists between the input layer 602 and the output layer 606. The hidden layer 604 includes "N" number of hidden layers, where "N" is an integer greater than or equal to one. In turn, each of the hidden layers also includes a set of nodes that are referred to herein as hidden nodes.

At the lowest level of the hidden layer 604, hidden nodes of that layer are interconnected to the input nodes. At the highest level of the hidden layer 604, hidden nodes of that layer are connected to the output nodes. If multiple hidden layers exist, the input nodes are interconnected to hidden nodes of the lowest hidden layer. In turn, these hidden nodes are interconnected to the hidden nodes of the next hidden layer and so on and so forth.

An interconnection represents a piece of information learned about the two interconnected nodes. The interconnection has a numeric weight that can be tuned (e.g., based on a training dataset), rendering the neural network 600 adaptive to inputs and capable of learning.

Generally, the hidden layer 604 allows knowledge about the input nodes of the input layer 602 to be shared among the nodes of the output layer 606. To do so, a transformation $f$ is applied to the input nodes through the hidden layer 604. In an example, the transformation $f$ is non-linear. Different non-linear transformations $f$ are possible. In an example, a particular non-linear transformations $f$ is selected based on cross-validation. For example, given known example pairs (x,y), where $x \in X$ and $y \in Y$, a function $f: X \rightarrow Y$ is selected when such a function results in the best matches.

The neural network 600 also uses a loss function l to find an optimal solution. The optimal solution represents the situation where no solution has a cost less than the cost of the optimal solution. A backpropagation algorithm that uses gradient descent to minimize the loss function l is used to train the neural network 600.

Figure 7:
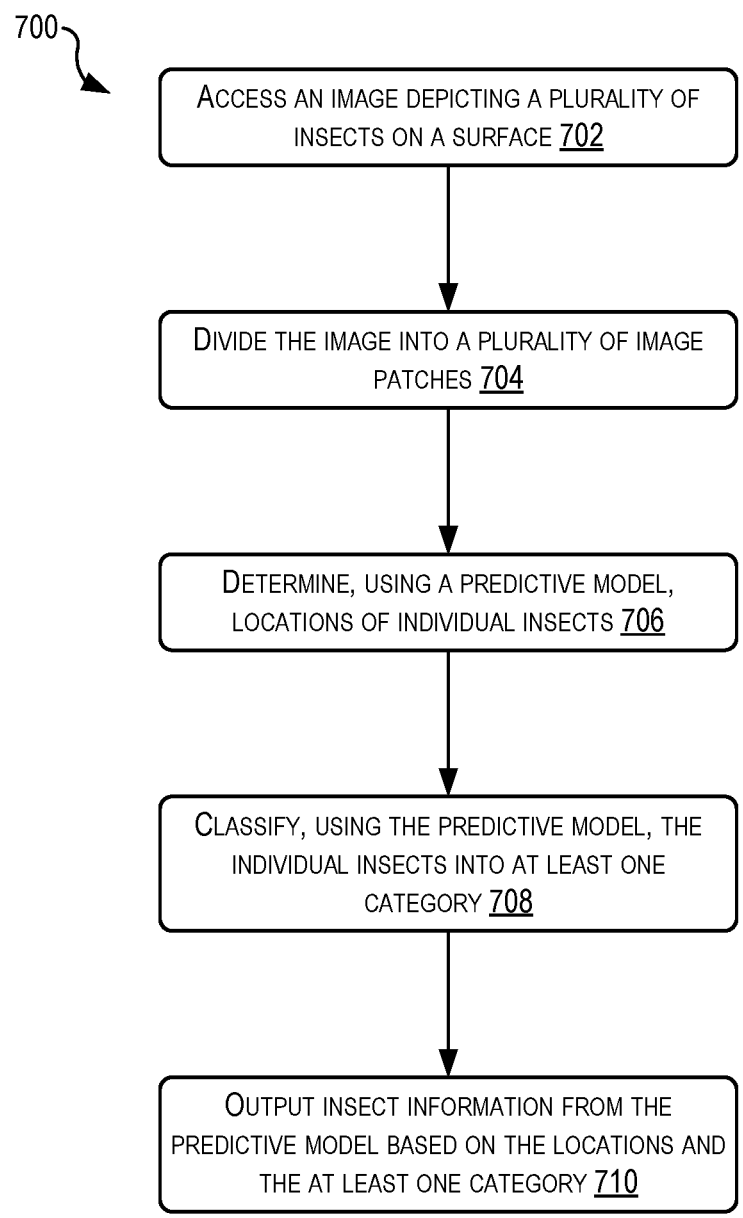
FIG. 7 illustrates an example a flow chart depicting an example process for using a predictive model to classify insects, according to at least one example.
Figure 8:
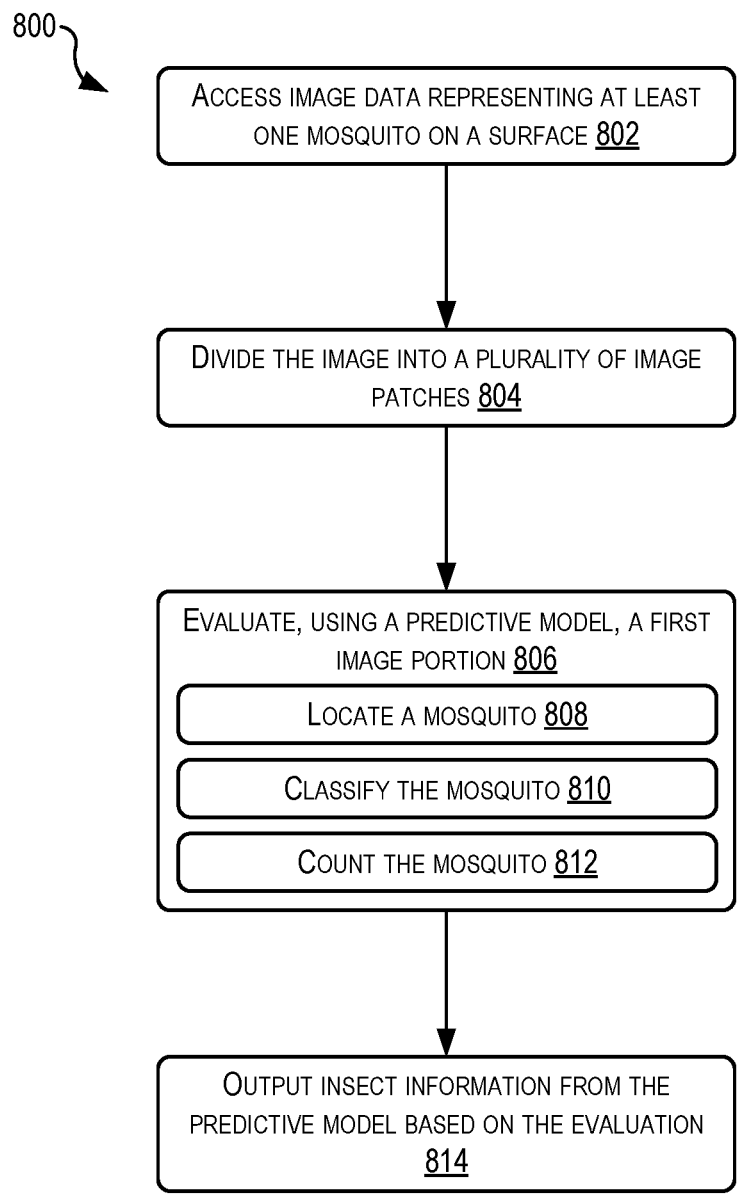
FIG. 8 illustrates an example a flow chart depicting an example process for using a predictive model to classify insects, according to at least one example.

FIGS. 7 and 8 illustrate example flow diagrams showing processes 700 and 800, according to at least a few examples. These processes, and any other processes described herein (e.g., the processes 100, 206, and 514), are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer readable storage medium, for example, in the form of a computer program including a plurality of instructions executable by one or more processors.

FIG. 7 illustrates an example a flow chart depicting the process 700 for using a predictive model to classify insects, according to at least one example. The process 700 may be performed by the computing device 106.

The process 700 may begin at 702 by accessing an image depicting a plurality of insects on a surface. In some examples, at least a portion of the plurality of insects are in a larva stage, a pupa stage, or an adult stage. In some examples, the surface may include a petri dish configured to retain the plurality of insects in an inactive state or an insect pathway configured to retain the plurality of insects in an active state.

At 704, the process 700 may include dividing the image into a plurality of image patches. In some examples, the plurality of image patches may be of uniform size and shape and/or may be of non-uniform size and shape. The plurality of images patches may represent an entirety of the image and/or may represent less than all of the image. In some examples, each image patch of the plurality of image patches is sized to correspond to an adult insect.

At 706, the process 700 may include determining, using a predictive model, locations of individual insects. The individual insects may be of the plurality of insects depicted in the plurality of image patches. In some examples, the locations of the individual insects may correspond to an image patch in which the individual insects were identified.

In some examples, determining, using the predictive model, the locations of the individual insects in the plurality of images patches may include selecting a first image patch of the plurality of image patches and evaluating, using the predictive model, the first image patch independently of other images patches of the plurality of image patches. In some examples, the plurality of image patches may be randomly selected for evaluation. In some examples, the locations of the individual insects correspond to coordinates within a grid system that overlaps a portion of the surface.

At 708, the process 700 may include classifying, using the predictive model, the individual insects into at least one category based at least in part on an insect parameter. The insect parameter may correspond to a characteristic of an insect that defines the category. In some examples, the insect parameters may include a sex parameter, a species parameter, a health parameter, a size parameter, a count parameter, or a life-stage parameter.

In some examples, classifying, using the predictive model, the individual insects into at least one other category may be based at least in part on the insect parameter. In some examples, classifying, using the predictive model, the individual insects into at least one other category may be based at least in part on a different insect parameter.

In some examples, the process 700 may further includes determining whether additional image data should be obtained based on a confidence value. For example, the confidence value may indicate how confident the system is in the classification performed earlier.

At 710, the process 700 may include outputting insect information from the predictive model based at least in part on the locations of the individual insects and the at least one category.

In some examples, the process 700 may further includes training the predictive model based at least in part on annotated image data patches that include annotations identifying insects present in the annotated image data patches. The annotated image patches may include (i) an identification of a head of an insect of the insects, (ii) an identification of a distal end of an abdomen of the insect, and (iii) an axis extending between the identification of the head and the identification of the distal end of the abdomen. In some examples, the identification of the head is a first label, the identification of the distal end is a second label, and the axis is an alignment axis that defines an orientation of the insect.

In some examples, training the predictive model may include dividing a training image into a plurality of training image data patches, randomly selecting individual training image data patches of the plurality of training image data patches, providing the individual training image patches for presentation at a user interface of a user device, receiving, via the user interface, user input including the annotations with respect to the individual training image patches, and associating the annotations with the individual training image patches to create the annotated image data patches.

In some examples, the process 700 may further include providing a user interface for presentation at a computing device based at least in part on the insect information. The user interface may include user interface elements corresponding to the individual insects. In this example, a formatting of the user interface elements may correspond to the at least one category.

In some examples, the process 700 may further include counting, using the predictive model, the individual insects in the plurality of image patches.

FIG. 8 illustrates an example a flow chart depicting the process 800 for using a predictive model to classify insects, according to at least one example. The process 800 may be performed by the computing device 106.

The process 800 may begin at 802 by accessing image data representing at least one mosquito on a surface.

At 804, the process 800 may include dividing the image into a plurality of image portions.

At 806, the process 800 may include evaluating, using a predictive model, a first image portion of the plurality of image portions. Evaluating at 806 may include a sub-processing including (i) locating the at least one mosquito represented in the first image portion (808), (ii) classifying the at least one mosquito into at least one category based at least in part on an insect parameter (810), and (iii) counting the at least one mosquito (812).

In some examples, prior to evaluating the first image portion, the process 800 may include randomly selecting the first image portion from the plurality of image portions. In some examples, the first image portion may include a central region and a context region that is bounded by a context window. The context region may include a frame that extends continuously around the central region. In some examples, a first dimension of the central region may correspond to a length dimension of an adult mosquito.

In some examples, the predictive model may include a neural network.

At 814, the process 800 may include outputting insect information from the predictive model relating to the evaluation. Generating the insect information may be based at least in part on locating the at least one mosquito and classifying the at least one mosquito. In some examples, the insect information may include location information that identifies a location of the at least one mosquito and classification information that identifies the at least one category to which the at least one mosquito was classified.

Figure 9:
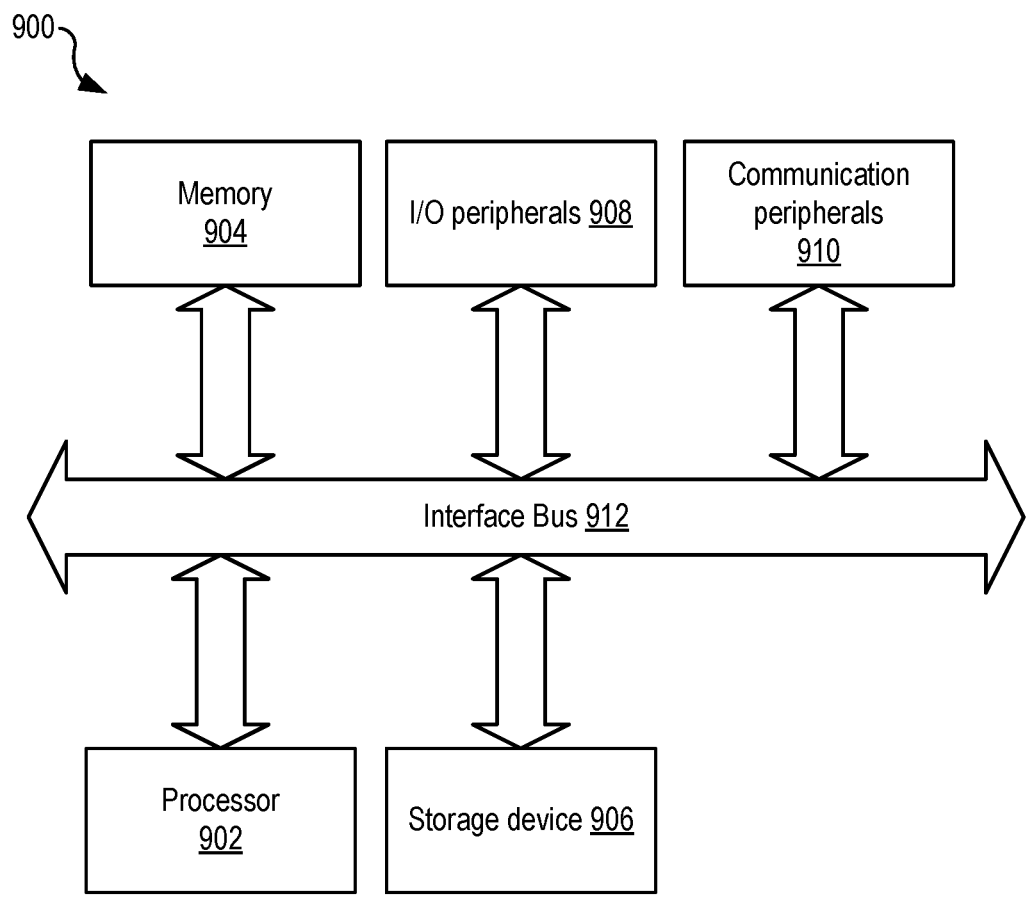
FIG. 9 illustrates an example system for implementing techniques relating to using a predictive model to classify insects, according to at least one example.

FIG. 9 illustrates examples of components of a computer system 900, according to at least one example. The computer system 900 may be a single computer such as a user computing device and/or can represent a distributed computing system such as one or more server computing devices. The computer system 900 is an example of the computing device 106.

The computer system 900 may include at least a processor 902, a memory 904, a storage device 906, input/output peripherals (I/O) 908, communication peripherals 910, and an interface bus 912. The interface bus 912 is configured to communicate, transmit, and transfer data, controls, and commands among the various components of the computer system 900. The memory 904 and the storage device 906 include computer-readable storage media, such as Radom Access Memory (RAM), Read ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. The memory 904 and the storage device 906 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with the computer system 900.

Further, the memory 904 includes an operating system, programs, and applications. The processor 902 is configured to execute the stored instructions and includes, for example, a logical processing unit, a microprocessor, a digital signal processor, and other processors. The memory 904 and/or the processor 902 can be virtualized and can be hosted within another computing system of, for example, a cloud network or a data center. The I/O peripherals 908 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 908 are connected to the processor 902 through any of the ports coupled to the interface bus 912. The communication peripherals 910 are configured to facilitate communication between the computer system 900 and other computing devices over a communications network and include, for example, a network interface controller, modem, wireless and wired interface cards, antenna, and other communication peripherals.

In the following, further examples are described to facilitate the understanding of the present disclosure.

Example 1

In this example, there is provided a computer-implemented method, including:
  accessing an image depicting a plurality of insects on a surface;
  determining, using a predictive model, locations of individual insects of the plurality of insects in the image;
  classifying, using the predictive model, the individual insects into at least one category based at least in part on an insect parameter; and
  outputting insect information from the predictive model based at least in part on the locations of the individual insects and the at least one category.

Example 2

In this example, there is provided a method of any of the preceding or subsequent examples wherein determining, using the predictive model, the locations of the individual insects in the images includes:
  dividing the image into a plurality of image patches; and
  evaluating, using the predictive model, the each image patch independently of other images patches of the plurality of image patches.

Example 3

In this example, there is provided a method of any of the preceding or subsequent examples, further including training the predictive model based at least in part on annotated image data patches that comprise annotations identifying and classifying insects present in the annotated image data patches.

Example 4

In this example, there is provided a method of any of the preceding or subsequent examples, wherein each annotation of the annotations includes (i) an identification of a head of an insect of the insects, (ii) an identification of a distal end of an abdomen of the insect, and (iii) an axis extending between the identification of the head and the identification of the distal end of the abdomen.

Example 5

In this example, there is provided a method of any of the preceding or subsequent examples, wherein training the predictive model includes:
  randomly selecting individual portions of a training image;
  providing the individual portions for presentation at a user interface of a user device;
  receiving, via the user interface, user input comprising the annotations with respect to the individual portions; and
  associating the annotations with the individual portions to create the annotated image data patches.

Example 6

In this example, there is provided a method of any of the preceding or subsequent examples, wherein the image is divided into a plurality of image patches, each being sized to depict an adult insect.

Example 7

In this example, there is provided a method of any of the preceding or subsequent examples, wherein at least a portion of the plurality of insects are in a larva stage, a pupa stage, or an adult stage.

Example 8

In this example, there is provided a method of any of the preceding or subsequent examples, wherein at least a first portion of the plurality of insects are male and a second portion are female.

Example 9

In this example, there is provided a method of any of the preceding or subsequent examples, further including providing a user interface for presentation at a computing device based at least in part on the insect information, the user interface comprising user interface elements corresponding to the individual insects.

Example 10

In this example, there is provided a method of any of the preceding or subsequent examples, wherein a formatting of the user interface elements corresponds to the at least one category.

Example 11

In this example, there is provided a method of any of the preceding or subsequent examples, further including classifying, using the predictive model, the individual insects into at least one other category based at least in part on the insect parameter and probabilities that the individual insects belong to the at least one category.

Example 12

In this example, there is provided a method of any of the preceding or subsequent examples, further including classifying, using the predictive model, the individual insects into at least one other category based at least in part on a different insect parameter and probabilities that the individual insects belong to the at least one other category.

Example 13

In this example, there is provided a method of any of the preceding or subsequent examples, wherein the insect parameter includes a sex parameter, a species parameter, a health parameter, a size parameter, a count parameter, a size parameter, a count parameter, or a life-stage parameter.

Example 14

In this example, there is provided a method of any of the preceding or subsequent examples, wherein the surface includes a petri dish configured to retain the plurality of insects in an inactive state or an insect pathway configured to retain the plurality of insects in an active state.

Example 15

In this example, there is provided a method of any of the preceding or subsequent examples, further includes counting, using the predictive model, the individual insects in the image.

Example 16

In this example, there is provided a system, including:
an imaging device configured to capture images of insects supported by a surface;
a computing device in communication with the imaging device, and configured to at least:
cause the imaging device to capture an image of the surface, the image comprising a plurality of insects;
determine, using a predictive model, locations of individual insects of the plurality of insects in the image;
classify, using the predictive model, the individual insects into at least one category based at least in part on an insect characteristic;
determine whether additional images should be captured based on a confidence value; and
output insect information from the predictive model based at least in part on the locations of the individual insects and the at least one category.

Example 17

In this example, there is provided a system of any of the preceding or subsequent examples, wherein:
the system further includes a display device in communication with the computing device; and
the computing device is further configured to provide a user interface on the display based at least in part on the insect information, the user interface including user interface elements corresponding to the individual insects.

Example 18

In this example, there is provided a system of any of the preceding or subsequent examples, wherein the user interface elements discriminate between first insects classified into the at least one category and second insects not classified into the at least one category.

Example 19

In this example, there is provided a system of any of the preceding or subsequent examples, wherein the insect information includes:
location information identifying the locations with respect to the surface; and
classification information identifying the at least one category.

Example 20

In this example, there is provided a system of any of the preceding or subsequent examples, wherein outputting the insect information comprises outputting first insect information that identifies a sex of an insect in the at least one category and outputting second insect information that identifies a location of the insect in the image.

Example 21

In this example, there is provided a system of any of the preceding or subsequent examples, wherein: the insect information comprises instructions for performing an action with respect to at least one insect belonging to the at least one category; and the action includes (i) a removal action that, when performed, causes removal of the at least one insect from the surface or (ii) a sterilization action that, when performed, sterilizes the at least one insect.

Example 22

In this example, there is provided a system of any of the preceding or subsequent examples, wherein the system further includes a robotic manipulator in communication with the computing device, the robotic manipulator configured to execute the instructions to perform the action.

Example 23

In this example, there is provided one or more non-transitory computer-readable medium comprising computer-executable instructions that, when executed by one or more computer systems, cause the computer systems to perform operations including:
  accessing an image depicting a plurality of insects;
  determining, using a predictive model, locations of individual insects of the plurality of insects in the image;
  classifying, using the predictive model, the individual insects into at least one category based at least in part on a mosquito characteristic; and
  outputting insect information from the predictive model based at least in part on the locations of the individual insects and the at least one category.

Example 24

In this example, there is provided a computer-implemented method, including:
  accessing image data representing at least one mosquito on a surface;
  evaluating, using a predictive model, a first image portion of the plurality of image portions by at least:
    (i) locating the at least one mosquito represented in the first image portion; and
    (ii) classifying the at least one mosquito into at least one category based at least in part on an insect parameter; and
  outputting insect information from the predictive model relating to the at least one mosquito based at least in part on locating the at least one mosquito and classifying the at least one mosquito.

Example 25

In this example, there is provided a method of any of the preceding or subsequent examples, wherein the predictive model includes a neural network.

Example 26

In this example, there is provided a method of any of the preceding or subsequent examples further including, prior to evaluating the first image portion, randomly selecting the first image portion from the plurality of image portions.

Example 27

In this example, there is provided a method of any of the preceding or subsequent examples, wherein the insect information includes location information that identifies a location of the at least one mosquito and classification information that identifies the at least one category to which the at least one mosquito was classified.

Example 28

In this example, there is provided a method of any of the preceding or subsequent examples, wherein the first image portion includes a central region and a context region that is bounded by a context window.

Example 29

In this example, there is provided a method of any of the preceding or subsequent examples, wherein the context region includes a frame that extends continuously around the central region.

Example 30

In this example, there is provided a method of any of the preceding or subsequent examples, wherein a first dimension of the central region corresponds to a length dimension of an adult mosquito.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method, comprising:
accessing an image depicting a plurality of insects on a surface;
dividing the image into a plurality of image patches;
defining, for each image patch, a central region and a context region, the context region surrounding the central region;
providing at least some of the image patches with the corresponding defined central regions and the corresponding defined context regions to a predictive model;
determining, using the predictive model, locations of individual insects of the plurality of insects in the image based on the provided central regions and context regions, wherein determining the locations of the individual insects in the image comprises:
determining a first location of a first insect based at least in part on a particular central region; and
determining a second location of a second insect based at least in part on a particular context region that includes a portion of the second insect;
classifying, using the predictive model and based on the provided central regions and context regions, the individual insects into at least one category based at least in part on an insect parameter; and
outputting insect information from the predictive model based at least in part on the locations of the individual insects and the at least one category.

2. The computer-implemented method of claim 1, wherein determining, using the predictive model, the locations of the individual insects in the image comprises evaluating, using the predictive model, each image patch independently of other image patches of the plurality of image patches.

3. The computer-implemented method of claim 1, further comprising training the predictive model based at least in part on annotated image data patches that comprise annotations identifying and classifying insects present in the annotated image data patches.

4. The computer-implemented method of claim 3, wherein each annotation of the annotations comprises (i) an identification of a head of an insect of the insects, (ii) an identification of a distal end of an abdomen of the insect, and (iii) an axis extending between the identification of the head and the identification of the distal end of the abdomen.

5. The computer-implemented method of claim 3, wherein training the predictive model comprises:
randomly selecting individual portions of a training image;
providing the individual portions for presentation at a user interface of a user device;
receiving, via the user interface, user input comprising the annotations with respect to the individual portions; and
associating the annotations with the individual portions to create the annotated image data patches.

6. The computer-implemented method of claim 1, wherein each image patch is sized to correspond to the dimensions of an adult insect.

7. The computer-implemented method of claim 1, wherein at least a first portion of the plurality of insects are male and a second portion are female.

8. The computer-implemented method of claim 1, further comprising providing a user interface for presentation at a computing device based at least in part on the insect information, the user interface comprising user interface elements corresponding to the individual insects.

9. The computer-implemented method of claim 8, wherein a formatting of the user interface elements corresponds to the at least one category.

10. The computer-implemented method of claim 1, further comprising classifying, using the predictive model, the individual insects into at least one other category based at least in part on the insect parameter and probabilities that the individual insects belong to the at least one category.

11. The computer-implemented method of claim 1, further comprising classifying, using the predictive model, the individual insects into at least one other category based at least in part on a different insect parameter and probabilities that the individual insects belong to the at least one other category.

12. The computer-implemented method of claim 1, wherein the insect parameter comprises a sex parameter, a species parameter, a health parameter, a size parameter, a count parameter, or a life-stage parameter.

13. The computer-implemented method of claim 1, wherein the surface comprises a petri dish configured to retain the plurality of insects in an inactive state or an insect pathway configured to retain the plurality of insects in an active state.

14. The computer-implemented method of claim 1, further comprising counting, using the predictive model, the individual insects in the image.

15. A system, comprising:
an imaging device configured to capture images of insects supported by a surface; and
a computing device in communication with the imaging device, and configured to at least:
cause the imaging device to capture an image of the surface, the image depicting a plurality of insects;
divide the image into a plurality of image patches;
define, for each image patch, a central region and a context region, the context region surrounding the central region;
provide at least some of the image patches with the corresponding defined central regions and the corresponding defined context regions to a predictive model;
determine, using the predictive model, locations of individual insects of the plurality of insects in the image based on the provided central regions and context regions, wherein determining the locations of the individual insects in the image comprises:
determining a first location of a first insect based at least in part on a particular central region; and
determining a second location of a second insect based at least in part on a particular context region that includes a portion of the second insect;
classify, using the predictive model and based on the provided central regions and context regions, the individual insects into at least one category based at least in part on an insect characteristic;
determine whether additional images should be captured based on a confidence value; and
output insect information from the predictive model based at least in part on the locations of the individual insects and the at least one category.

16. The system of claim 15, wherein:
the system further comprises a display device in communication with the computing device; and
the computing device is further configured to provide a user interface on the display device based at least in part on the insect information, the user interface comprising user interface elements corresponding to the individual insects.

17. The system of claim 16, wherein the user interface elements discriminate between first insects classified into the at least one category and second insects not classified into the at least one category.

18. The system of claim 15, wherein the insect information comprises:
location information identifying the locations with respect to the surface; and
classification information identifying the at least one category.

19. The system of claim 15, wherein outputting the insect information comprises outputting first insect information that identifies a sex of an insect in the at least one category and outputting second insect information that identifies a location of the insect in the image.

20. The system of claim 15, wherein:
the insect information comprises instructions for performing an action with respect to at least one insect belonging to the at least one category; and
the action comprises (i) a removal action that, when performed, causes removal of the at least one insect from the surface or (ii) a sterilization action that, when performed, sterilizes the at least one insect.

21. The system of claim 20, wherein the system further comprises a robotic manipulator in communication with the computing device, the robotic manipulator configured to execute the instructions to perform the action.

22. One or more non-transitory computer-readable medium comprising computer-executable instructions that, when executed by one or more computer systems, cause the one or more computer systems to:
access an image depicting a plurality of insects on a surface;
divide the image into a plurality of image patches;
define, for each image patch, a central region and a context region, the context region surrounding the central region;
provide at least some of the image patches with the corresponding defined central regions and the corresponding defined context regions to a predictive model;
determine, using the predictive model, locations of individual insects of the plurality of insects in the image based on the provided central regions and context regions, wherein determining the locations of the individual insects in the image comprises:
determining a first location of a first insect based at least in part on a particular central region; and
determining a second location of a second insect based at least in part on a particular context region that includes a portion of the second insect;
classify, using the predictive model and based on the provided central regions and context regions, the individual insects into at least one category based at least in part on a mosquito characteristic; and
output insect information from the predictive model based at least in part on the locations of the individual insects and the at least one category.

23. A computer-implemented method, comprising:
accessing image data of an image that represents first and second mosquitoes on a surface;
dividing the image into a plurality of image patches;
defining, for each image patch, a central region and a context region, the context region surrounding the central region;
determining, using the predictive model, locations of individual mosquitoes of plurality of mosquitoes in the image based on defined central regions and context regions, wherein determining the locations of the individual mosquitoes in the image comprises:
evaluating, a first image patch of the plurality of image patches by at least:
(i) locating the first mosquito represented in the central region of the first image patch;
(ii) locating the second mosquito, a portion of which is represented in the context region of the first image patch; and
(ii) classifying the first and second mosquitoes into at least one category based at least in part on an insect parameter and the central region and the context region, and outputting insect information from the predictive model based at least in part on locating the first and second mosquitoes and classifying the first and second mosquitoes.

24. The computer-implemented method of claim 23, wherein the predictive model comprises a neural network.

25. The computer-implemented method of claim 23, further comprising, prior to evaluating the first image patch randomly selecting the first image patch from the plurality of image patches.

26. The computer-implemented method of claim 23, wherein the insect information comprises location information that identifies first and second locations of the first and second mosquitoes and classification information that identifies the at least one category to which the first and second mosquitoes were classified.

27. The computer-implemented method of claim 23, wherein the context region comprises a frame that extends contiguously around the central region.

28. The computer-implemented method of claim 23, wherein a first dimension of the central region corresponds to a length dimension of an adult mosquito.

29. The computer-implemented method of claim 1, wherein determining the locations of the individual insects further comprises determining, with respect to a fixed point of the surface, a set of coordinates for each image patch that includes an insect of the plurality of insects.

30. The computer-implemented method of claim 1, further comprising providing a boundary between a respective central region and a respective context region to the predictive model; and wherein the classifying is further based on the boundary.

* * * * *